(12) United States Patent
Whittle et al.

(10) Patent No.: US 11,174,742 B2
(45) Date of Patent: Nov. 16, 2021

(54) TURBINE SECTION OF A GAS TURBINE ENGINE WITH CERAMIC MATRIX COMPOSITE VANES

(71) Applicants: Rolls-Royce plc, London (GB); Rolls-Royce Corporation, Indianapolis, IN (US)

(72) Inventors: Michael J. Whittle, Derby (GB); Daniel K. Vetters, Indianapolis, IN (US)

(73) Assignees: Rolls-Royce plc; Rolls-Royce Corporation, Indianapolis, IN (US)

( * ) Notice: Subject to any disclaimer, the term of this patent is extended or adjusted under 35 U.S.C. 154(b) by 105 days.

(21) Appl. No.: 16/517,003

(22) Filed: Jul. 19, 2019

(65) Prior Publication Data

US 2021/0017867 A1 Jan. 21, 2021

(51) Int. Cl.
| | | |
|---|---|---|
| F01D 25/24 | (2006.01) | |
| F01D 5/30 | (2006.01) | |
| F01D 5/22 | (2006.01) | |
| F01D 5/28 | (2006.01) | |
| F01D 11/08 | (2006.01) | |
| F01D 9/04 | (2006.01) | |
| F01D 25/00 | (2006.01) | |

(52) U.S. Cl.
CPC ........... *F01D 5/3084* (2013.01); *F01D 5/225* (2013.01); *F01D 5/282* (2013.01); *F01D 9/041* (2013.01); *F01D 11/08* (2013.01); *F01D 25/005* (2013.01); *F01D 25/24* (2013.01); *F05D 2220/32* (2013.01); *F05D 2240/24* (2013.01); *F05D 2240/55* (2013.01); *F05D 2300/6033* (2013.01)

(58) Field of Classification Search
CPC ... F01D 5/225; F01D 9/00; F01D 9/04; F01D 9/041; F01D 9/042; F01D 11/08; F01D 25/24; F01D 25/243; F01D 25/246; F05D 2240/11; F05D 2240/14; F05D 2240/55; F05D 2240/90; F05D 2240/91
See application file for complete search history.

(56) References Cited

U.S. PATENT DOCUMENTS

| | | |
|---|---|---|
| 5,797,723 A | 8/1998 | Frost et al. |
| 6,340,285 B1 | 1/2002 | Gonyou et al. |
| 6,390,771 B1 | 5/2002 | Gervais et al. |
| 7,524,164 B2 | 4/2009 | Wunderlich et al. |
| 8,821,114 B2 | 9/2014 | Afanasiev et al. |
| 9,500,095 B2 | 11/2016 | Pietrobon et al. |
| 9,506,374 B2 | 11/2016 | Batt |
| 9,546,557 B2* | 1/2017 | Grooms, III .............. F01D 5/18 |
| 2009/0169361 A1* | 7/2009 | Cole ........................ F01D 5/082 |
| | | 415/115 |
| 2010/0166565 A1* | 7/2010 | Uskert ...................... F01D 5/10 |
| | | 416/226 |
| 2016/0003078 A1* | 1/2016 | Stevens ................. F01D 11/005 |
| | | 277/647 |
| 2016/0017721 A1* | 1/2016 | Landwehr ............... F01D 5/225 |
| | | 416/189 |
| 2016/0177761 A1 | 6/2016 | Huizenga et al. |

(Continued)

*Primary Examiner* — Woody A Lee, Jr.
*Assistant Examiner* — Danielle M. Christensen
(74) *Attorney, Agent, or Firm* — Barnes & Thornburg LLP

(57) ABSTRACT

A turbine section for use in gas turbine engine includes a turbine case, turbine shroud rings, a turbine vane assembly, and a vane mount ring. The vane mount ring couples the turbine vane assembly to the turbine case.

20 Claims, 3 Drawing Sheets

(56) References Cited

U.S. PATENT DOCUMENTS

2016/0201488 A1 7/2016 Carr et al.
2017/0335705 A1 11/2017 Tyler, Jr. et al.
2018/0238184 A1 8/2018 Reynolds et al.

* cited by examiner

TURBINE SECTION OF A GAS TURBINE ENGINE WITH CERAMIC MATRIX COMPOSITE VANES

FIELD OF THE DISCLOSURE

The present disclosure relates generally to gas turbine engines, and more specifically to turbine sections of such engines, especially those with ceramic matrix composite components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The static vane assemblies include fixed airfoils that smooth and redirect air moving through the turbine. The rotating wheel assemblies include disks carrying blades around their outer edges.

Some turbines are now being designed to include components made from ceramic matrix composite materials. Ceramic matrix composite materials can generally withstand higher temperatures than current metallic materials. Use of ceramic matrix composite materials can allow for increased temperatures within the turbine and/or decreased cooling air use in the turbine such that the overall efficiency of the turbine can be improved. Use of ceramic matrix composite materials can also allow for a weight reduction of the engine components. Accordingly, further development of designs incorporating ceramic matrix composite materials is of interest.

SUMMARY

The present disclosure may comprise one or more of the following features and combinations thereof.

A turbine section of a gas turbine engine may include a turbine case, a turbine shroud ring, a turbine vane assembly, and a vane mount ring. The turbine case may comprise metallic materials. The turbine shroud may be adapted to extend around a turbine wheel to block gases from passing over turbine blades during use of the turbine section in the gas turbine engine. The turbine vane assembly may comprise ceramic matrix composite materials. The vane mount ring may couple the turbine vane assembly to the turbine case.

In some embodiments, the turbine case may include an annular shell and a first bracket. The annular shell may extend around a central reference axis. The first bracket may extend radially inward from the annular shell.

In some embodiments, the turbine shroud ring may include a seal segment and a seal segment carrier. The seal segment may comprise ceramic matrix composite materials and extend at least partway around the central axis. The seal segment carrier may comprise metallic materials and may be coupled to the seal segment to receive loads applied to the seal segment by gases passing through the turbine section.

In some embodiments, the turbine vane assembly may include a turbine vane and a vane-support spar. The turbine vane may comprise ceramic matrix composite materials and be shaped to redirect hot gases flowing through the turbine section. The vane-support spar may comprise metallic materials and extend radially through the turbine vane to receive loads applied to the turbine vane by gases passing through the turbine section.

In some embodiments, the vane mount ring may couple the vane-support spar and the turbine vane of the turbine vane assembly to the first bracket of the turbine case. The vane mount ring may interface with the seal segment carrier so that loads applied to both the seal segment and the turbine vane by gases passing through the turbine section are carried to the turbine case at the first bracket avoiding the need for independent case interfaces for the seal segment and the turbine vane.

In some embodiments, the vane mount ring may interface with the seal segment carrier at a bird mouth connection. The bird mouth connecting maybe a coupling in which an axially-extending flange is received in a corresponding axially-extending slot to couple the vane mount ring to the seal segment carrier.

In some embodiments, the seal segment carrier may be shaped to include a hanger. The hanger may directly engage the first bracket of the turbine case.

In some embodiments, the turbine shroud ring may be arranged axially forward of the turbine vane. The hanger of the seal segment carrier may be shaped to support installation of the turbine shroud ring into the turbine case from a forward side of the turbine case. The bird mouth connection may be shaped to support installation of the turbine vane assembly from an aft side of the turbine case.

In some embodiments, a seal may be located radially inward of the bird mouth connection between the vane mount ring and the seal segment carrier. In some embodiments, the seal may be located within a circumferentially-extending seal passageway defined by the vane mount ring and the seal segment carrier.

In some embodiments, the turbine section may further include a second turbine shroud ring. The second turbine shroud ring may be adapted to extend around a second turbine wheel.

In some embodiments, the second turbine shroud ring may include a second seal segment and a second seal segment carrier. The second seal segment may comprise ceramic matrix composite materials and extend around the central axis. The second seal segment carrier may comprise metallic materials and may be coupled to the second seal segment to receive loads applied to the second seal segment by gases passing through the turbine section.

In some embodiments, the turbine case may further include a second bracket. The second bracket may extend radially inward from the annular shell.

In some embodiments, the vane mount ring may be integral with the second seal segment carrier to form a one-piece component. The integral one-piece component may be formed so that loads applied to both the second seal segment and the turbine vane by gases passing through the turbine section are carried to the turbine case via the second bracket. In some embodiments, the vane mount ring may be integral with the first seal segment carrier to form a one-piece component.

According to another aspect of the present disclosure, a turbine section of a gas turbine engine may include a turbine case, a turbine shroud, a turbine vane assembly, and a vane mount ring. The turbine case may include an annular shell that extends around a central reference axis and a first bracket that extends radially inward from the annular shell. The turbine shroud ring may be adapted to extend around a turbine wheel. The turbine vane assembly may include a turbine vane comprising ceramic matrix composite materials shaped to redirect hot gases flowing through the turbine section and a vane-support spar comprising metallic materials that extends radially through the turbine vane. The vane mount ring may interface with the turbine shroud ring so that loads applied to both the turbine shroud ring and the turbine vane by gases passing through the turbine section are carried to the turbine case at the first bracket.

In some embodiments, the vane mount ring may interface with the turbine shroud ring at a bird mouth connection. The bird mouth connection may be a coupling in which an axially-extending flange is received in a corresponding axially-extending slot to couple the vane mount ring to the turbine shroud ring.

In some embodiments, one of the turbine shroud ring and the vane mount ring may be shaped to include a hanger. The hanger may directly engage the first bracket of the turbine case.

In some embodiments, a seal is located radially inward of the bird mouth connection between the vane mount ring and the turbine shroud ring. In some embodiments, the seal may be located within a circumferentially-extending seal passageway defined by the vane mount ring and the turbine shroud ring.

In some embodiments, the turbine section may further include a second turbine shroud ring. The second turbine shroud ring may be adapted to extend around a second turbine wheel.

In some embodiments, the second turbine shroud ring may include a plurality of seal segments. The plurality of seal segments may be arranged around the central reference axis.

In some embodiments, the turbine case may include a second bracket. The second bracket may extend radially inward from the annular shell.

In some embodiments, the vane mount ring may be arranged radially outward of the plurality of seal segments included in the second turbine shroud ring. In some embodiments, the vane mount ring may provide a carrier for supporting the plurality of seal segments.

In some embodiments, the turbine shroud ring may include a plurality of seal segments. The plurality of seal segments may be arranged around the central reference axis. The vane mount ring may be arranged radially outward of the plurality of seal segments included in the turbine shroud ring to provide a carrier for supporting the plurality of seal segments.

According to another aspect of the present disclosure, a turbine section of a gas turbine engine may include a turbine case, a turbine shroud ring, a turbine vane assembly, and a vane mount ring. The turbine case may comprise metallic materials. The turbine shroud ring may be adapted to extend around a turbine wheel. The turbine vane assembly may include a turbine vane comprising ceramic matrix composite materials shaped to redirect hot gases flowing through the turbine section and a vane-support spar comprising metallic materials that extends radially through the turbine vane to receive loads applied to the turbine vane by gases passing through the turbine section. The vane mount ring may be coupled to the turbine vane assembly.

In some embodiments, the turbine case may include an annular shell and a first bracket. The annular shell may extend around a central reference axis. The first bracket may extend radially inward from the annular shell.

In some embodiments, the turbine shroud ring may include a seal segment and a seal segment carrier. The seal segment may extend at least partway around the central axis. The seal segment carrier may be coupled to the seal segment.

In some embodiments, the vane mount ring may interface with the seal segment carrier. The seal segment carrier may be coupled to the case at the first bracket so that loads applied to both the seal segment and the turbine vane by gases passing through the turbine section are carried to the turbine case at the first bracket.

In some embodiments, the vane mount ring may interface with the seal segment carrier at a bird mouth connection. The bird mouth connection may be a coupling in which an axially-extending flange is received in a corresponding axially-extending slot to couple the vane mount ring to the seal segment carrier.

In some embodiments, the seal segment carrier may be shaped to include a hanger. The hanger may directly engage the first bracket of the turbine case.

In some embodiments, a seal may be located radially inward of the bird mouth connection between the vane mount ring and the seal segment carrier. In some embodiments, the seal may be located within a circumferentially-extending seal passageway defined by the vane mount ring and the seal segment carrier.

These and other features of the present disclosure will become more apparent from the following description of the illustrative embodiments.

DETAILED DESCRIPTION OF THE DRAWINGS

Figure 1:
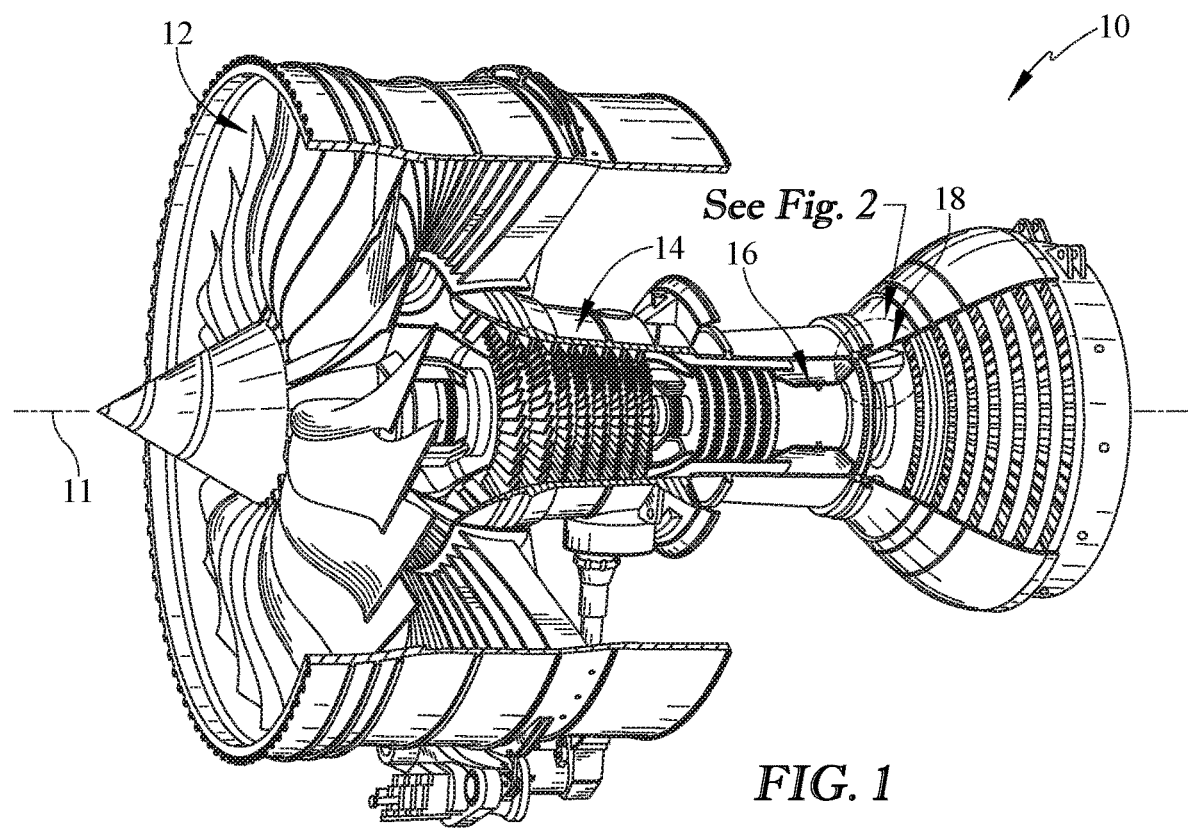
FIG. 1 is a cutaway view of a gas turbine engine that includes a fan, a compressor, a combustor, and a turbine section that includes turbine shroud rings arranged around a central axis and a turbine vane assembly that are both configured to interact with hot combustion products received from the combustor.

For the purposes of promoting an understanding of the principles of the disclosure, reference will now be made to a number of illustrative embodiments illustrated in the drawings and specific language will be used to describe the same.

A turbine section 18 according to the present disclosure is adapted for use in a gas turbine engine 10 as suggested in FIG. 1. The gas turbine engine 10 includes a fan 12, a compressor 14, a combustor 16, and the turbine section 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

Figure 2:
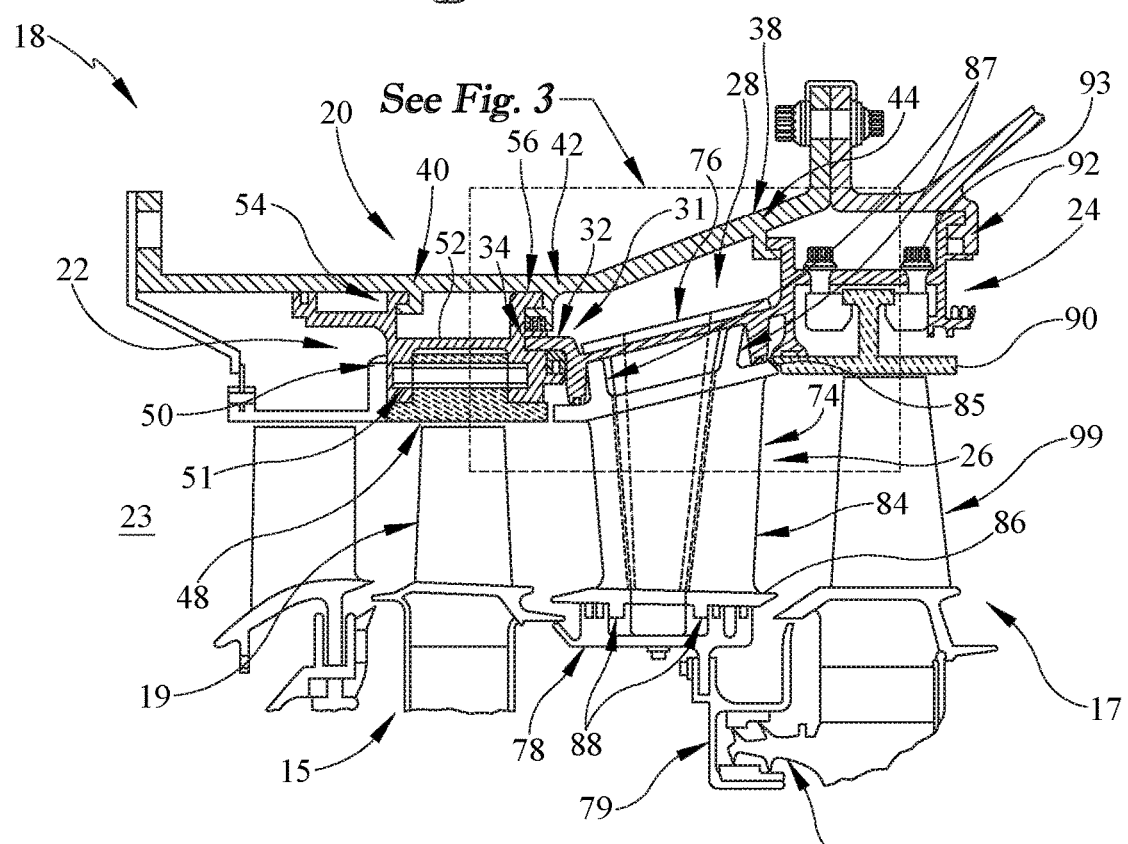
FIG. 2 is a cross sectional view of a portion of the turbine section of the gas turbine engine of FIG. 1 showing that the turbine section includes a turbine case, forward and aft turbine shroud rings, the turbine vane assembly located axially between the forward and aft turbine shroud rings, and a vane mount ring that couples the turbine vane assembly to the turbine case and interfaces with the forward turbine shroud ring to transfer loads from the turbine vane assembly and the forward turbine shroud ring to the turbine case.
Figure 3:
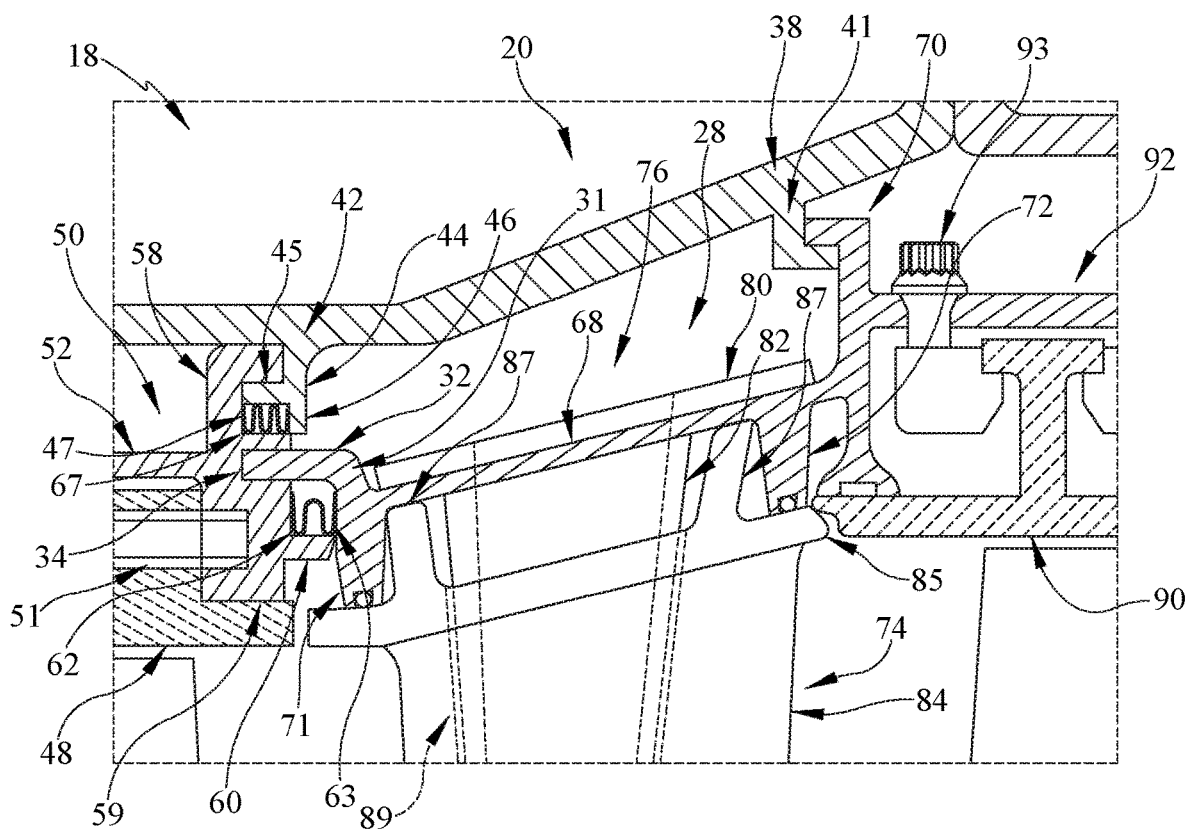
FIG. 3 is a detail view of the turbine section of FIG. 2 showing that the forward turbine shroud ring includes a seal segment and a seal segment carrier that couples the seal segment to the turbine case, and further showing the vane mount ring interfaces the seal segment carrier at a bird mount connection to interface the components.

The turbine section 18 includes a turbine case 20, first and second turbine shroud rings 22, 24, a turbine vane assembly 26, and a vane mount ring 28 as shown in FIGS. 2 and 3. The turbine case 20 comprises metallic materials and extends around a central reference axis 11 of the gas turbine engine 10. The first and second, or forward and aft turbine shroud rings 22, 24 are adapted to extend around forward and aft turbine wheels 15, 17 to block gases from passing over turbine blades 19 during use of the turbine section 18 in the gas turbine engine 10. The forward turbine shroud ring 22 is arranged on a forward side of the turbine case 20 axially forward of the turbine vane assembly 26, while the aft turbine shroud ring 24 is arranged on an aft side of the turbine case 20 axially aft of the turbine vane assembly 26. The turbine vane assembly 26 is shaped to redirect hot gasses flowing through the turbine section 18.

The vane mount ring 28 couples the turbine vane assembly 26 to the turbine case 20 and interfaces with the forward turbine shroud ring 22 as shown in FIGS. 2 and 3. This interface carries loads applied by gases passing through the turbine section 18 to the forward turbine shroud ring 22 and the turbine vane assembly 26 to the turbine case 20 at a bracket 42 of the turbine case 20. The loads are carried to the turbine case 20 at the bracket 42 of the turbine case 20 so as to avoid the need for independent case interfaces for the forward turbine shroud ring 22 and the turbine vane assembly 26. In the illustrative embodiment, the vane mount ring 28 interfaces with the forward turbine shroud ring 22 at a bird mouth connection 31. The bird mouth connection 31 is a coupling in which an axially-extending flange 32 of the vane mount ring 28 is received in a corresponding axially-extending slot 34 of the forward turbine shroud ring 22 to engage the vane mount ring 28 with the turbine shroud ring 22.

Interfacing the forward turbine shroud ring 22 and the vane mount ring 28 at a single location increases the radial space above the turbine vane assembly 26 as shown in FIG. 3. This space can allow for support structures for the turbine vane assembly 26. The interface can also reduce the relative radial movement between the forward shroud ring 22 and the turbine vane assembly 26. The arrangement can reduce the steps in the flow path between the forward turbine shroud ring 22 and the turbine vane assembly 26. The single interface can also reduce the relative axial movement between the components allowing for seals 47, 63 included in the turbine section 18 with desirable sealing capabilities.

Figure 4:
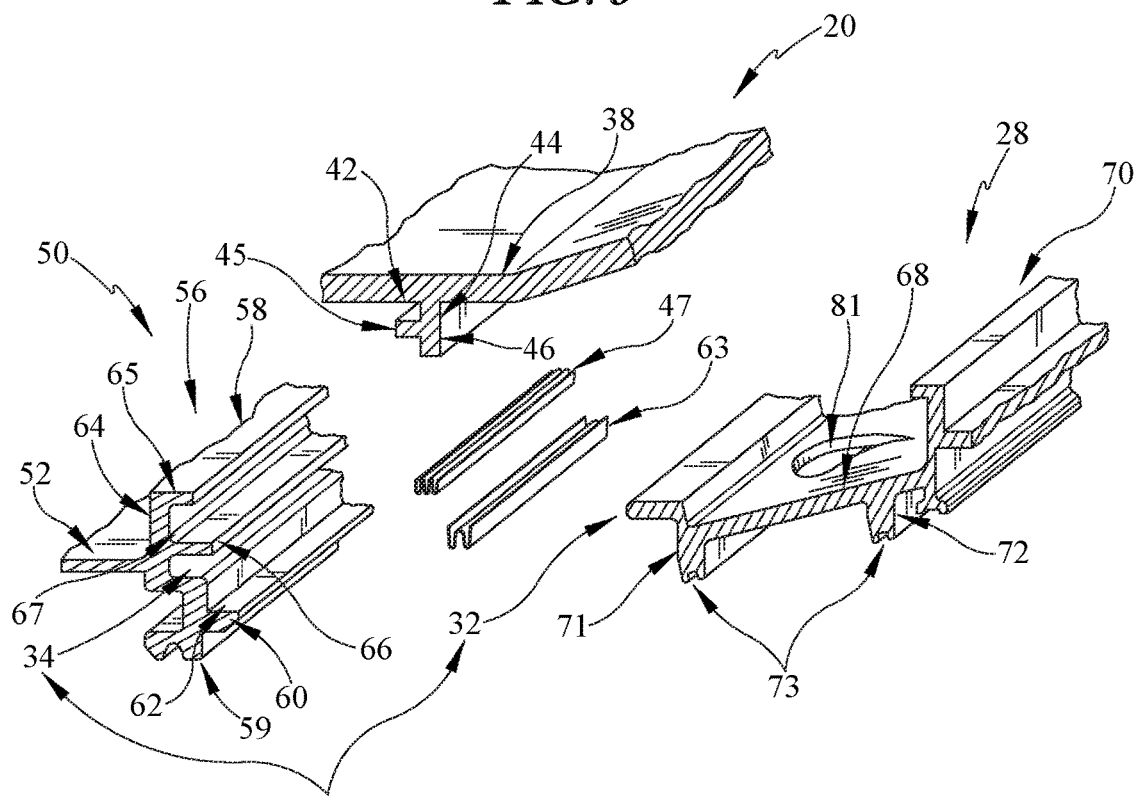
FIG. 4 is an exploded view of the turbine section of FIG. 3 showing that the bird mouth connection is formed by an axially-extending flange of the vane mount ring that is received in a corresponding axially-extending slot of the seal segment carrier, and further showing seals are located radially inward and outward of the bird mouth connection between the vane mount ring and the seal segment carrier.

The turbine case 20 includes an annular shell 38, a forward bracket 40, an aft bracket 41, and a middle bracket 42 as shown in FIGS. 2-4. The annular shell 38 extends around the central reference axis 11. The forward bracket 40 extends radially inward from the annular shell 38. The aft bracket 41 is spaced axially aft of the forward bracket 40 and extends radially inward from the annular shell 38. The middle bracket 42 extends radially inward from the annular shell 38 axially between the forward hanger 40 and the aft hanger 41.

The middle bracket 42 includes a radially-extending portion 44, an axially-extending portion 45, and a stop tab 46 as shown in FIGS. 3 and 4. The radially-extending portion 44 extends radially inward from the annular shell 38. The axially-extending portion 45 extends axially forward from the radially-extending portion 44. The stop tab 46 extends radially inward from the radially-extending portion 44 at the axially-extending portion to block removal of a seal 47 located between the middle bracket 42 and the turbine shroud ring 22.

The forward turbine shroud ring 22 includes a forward seal segment 48, a forward seal segment carrier 50, and pins 51 as shown in FIGS. 2-4. The forward seal segment 48 comprises ceramic matrix composite materials and extends at least partway around the central axis 11. The forward seal segment carrier 50 comprises metallic materials and is coupled to the seal segment 48 to receive loads applied to the seal segment 48 by gases passing through the turbine section 18. The pins 51 extends axially through a portion of the seal segment 48 and into the seal segment carrier 50 to couple the seal segment carrier 50 and the seal segment 48.

The forward seal segment carrier 50 includes a carrier panel 52, a forward carrier hanger 54, and an aft carrier hanger 56 as shown in FIGS. 2-4. The carrier panel 52 extends as least partway around the central axis 11. The forward carrier hanger 54 directly engages the forward bracket 40 of the turbine case 20. The aft carrier hanger 56 directly engages the middle bracket 42 of the turbine case 20. The forward carrier hanger 54 and aft carrier hanger 56 are shaped to support the seal segment 48 and interface the pins 51 to couple the seal segment 48 to the carrier 50. The aft carrier hanger 56 is also shaped to support installation of the forward turbine shroud ring 22 from the forward side of the turbine case 20 as well as installation of the turbine vane assembly 26 from the aft side of the turbine case 20.

The aft carrier hanger 56 is shaped to include a hook 58, a segment carrier portion 59, and a locating flange 60 as shown in FIGS. 3 and 4. The hook 58 extends radially outward from the carrier panel 52 and engages the middle bracket 42. The segment carrier portion 59 extends radially inward form the carrier panel 52 and supports the installation of the forward seal segment 48. The locating flange 60 extends axially aft from the segment carrier portion 59 of the hanger 56 and is configured to support a seal 63 in a first circumferentially-extending seal passageway 62 defined by the vane mount ring 28 and the seal segment carrier 50.

The hook 58 of the aft carrier hanger 56 is shaped to include a radial post 64, an attachment flange 65, and a support flange 66 as shown in FIGS. 3 and 4. The radial post 64 extends radially outward from the carrier panel 52. The attachment flange 65 extends axially aft from the radial post 64 at an outer radial end of the radial post 64 and engages the middle bracket 42 of the turbine case 20 to couple the forward turbine shroud ring 22 to the turbine case 20. The support flange 66 extends axially aft from the radial post 64 radially inward of the attachment flange to form a second circumferentially-extending seal passageway 67 between the attachment flange 65 and the support flange 66. In the illustrative embodiment, the seal 47 is located in the second seal passageway 67 and the stop tab 46 blocks removal of the seal 47 out of the passageway 67.

In the illustrative embodiment, the turbine section 18 includes at least two seals 47, 63 as shown in FIGS. 3 and 4. The outer seal 47 is located radially outward of the bird mouth connection 31 between the vane mount ring 28 and the forward seal segment carrier 50, while the inner seal 63 is located radially inward of the bird mouth connection 31 between the vane mount ring 28 and the forward seal segment carrier 50. The first seal 47 arranged in the second circumferentially-extending seal passageway 67 is a "W" seal. The second seal 63 arranged in the first circumferentially-extending seal passageway 62 is also a "W" seal. In other embodiments, the seals 47, 63 may be another suitable seal, such as an omega seal, rope seal, "E" seal, cup seal, etc.

In the illustrative embodiment, the support flange 66 also forms the axially-extending slot 34 as shown in FIGS. 3 and 4. The axially-extending slot 34 is formed between the support flange 66 and the segment carrier portion 59. The axially-extending slot 34 receives the axially-extending flange 32 of the vane mount ring 28 to form the bird mount connection 31 between the forward turbine shroud ring 22 and the vane mount ring 28.

The vane mount ring 28 includes a mount body panel 68, a forward mount hanger 32, and an aft mount hanger 70 as shown in FIGS. 2-4. The mount body panel 68 extends at least partway around the central axis 11. The forward mount hanger 32 extends axially forward from the mount body panel 68 and directly engages the aft carrier hanger 56. In the illustrative embodiment, the forward mount hanger 32 is shaped as the axially-extending flange 32 that extends into the corresponding axially-extending slot 34 formed in the aft carrier hanger 56 of the forward seal segment carrier 50. The aft mount hanger 70 extends radially outward from the mount body panel 68 at a location axially-aft of the forward mount hanger 32 and directly engages the aft bracket 41 of the turbine case 20.

In the illustrative embodiments, the vane mount ring 28 further includes a forward support 71 and an aft support 72 and shown in FIGS. 3 and 4. The forward and aft supports 71, 72 extend radially inward from the mount body panel 68 and engage the turbine vane assembly 26. The aft support 72 is spaced axially aft of the forward support 71.

The forward and aft supports 71, 72 are also shaped to include seal receivers 73 as shown in FIG. 4. The seal receivers 73 are provided by radially-inwardly facing channels 73 formed in the supports 71, 72 and open radially inward toward the turbine vane assembly 26 to receive a seal. The seals may be a rope seal, "E" seal, or another suitable seal or gasket type.

Turning again to the turbine vane assembly 26, the turbine vane assembly 26 includes a turbine vane 74, a vane-support spar 76, a spar retainer 78, and a seal land 79 as shown in FIGS. 2-4. The turbine vane 74 comprises ceramic matrix composite materials and is shaped to redirect hot gases flowing through the turbine section 18. The vane-support spar 76 comprises metallic materials and extends radially through the turbine vane 74 to receive loads applied to the turbine vane 74 by gases passing through the turbine section 18. The vane-support spar 76 couples to the vane mount ring 28 to transfer the loads from the turbine vane 74 out through the turbine case 20. The spar retainer 78 is located radially inward of the turbine vane 74 and coupled to the vane-support spar 76. The seal land 79 is coupled to the spar retainer 78 and is engaged by a seal rotor 21 of the turbine wheel 15 to seal compartments within the turbine section 18.

The vane-support spar 76 includes an outer mount panel 80 and a rod 82 as shown in FIGS. 2 and 3. The outer mount panel 80 is arranged radially outward of the mount body panel 68 of the vane mount ring 28 so as to couple the vane-support spar 76 to the vane mount ring 28. The rod 82 extends radially inward from the outer mount panel 80 through a hole 81 in the mount body panel 68 and the turbine vane to the spar receiver 78. The rod 82 is coupled to the spar receiver 78 to transfer axial loads applied to seal land 79 out through the turbine case 20.

In the illustrative embodiment, the rod 82 of the vane-support spar 76 is hollow. In some embodiments, the rod 82 may be hollow and include cooling holes to transmit cooling air to the vane 74 and/or into the inter-disk cavity between the turbine wheels 15, 17.

The turbine vane 74 includes an airfoil 84, outer and inner end walls 85, 86, and outer and inner load transfer features 87, 88 as shown in FIGS. 2 and 3. The airfoil 84 extends between and interconnects the outer end wall 85 and the inner end wall 86 and is shaped to include a vane cavity 89 extending radially through the airfoil 84 and opens at the inner and outer end walls 86, 85. The outer end wall 85 defines a radially outer boundary of a primary gas path 23 for the gases passing through the turbine section 18. The inner end wall 86 defines a radially inner boundary of the primary gas path 23. In the illustrative embodiment, the forward and aft turbine shroud rings 22, 24 define the radially outer boundary of the primary gas path 23 axially forward and axially aft of the airfoil 84.

The outer and inner load transfer features 87, 88 of the turbine vane 74 transfer loading of the airfoil 84 to the vane-support spar 76 at radial inner and outer ends of the turbine vane 74. In the illustrative embodiment, the outer load transfer features 87 engage the forward and aft supports 71, 72 of the vane mount ring 28. The inner load transfer features 88 engage the spar receiver 78.

In the illustrative embodiment, the outer end wall 85, inner end wall 86, the airfoil 84, and the outer and inner load transfer features 87, 88 of the vane 74 are integrally formed from ceramic matrix composite materials such that the outer end wall 85, inner end wall 86, the airfoil 84, and the outer and inner load transfer features 87, 88 are included in a one-piece vane component as shown in FIGS. 2 and 3. In other embodiments, the outer end wall 85, inner end wall 86, and the airfoil 84 may be formed as separate components.

Turning again to the aft turbine shroud ring 24, the aft turbine shroud ring 24 includes an aft seal segment 90, an aft seal segment carrier 92, and threaded studs 93 as shown in FIGS. 2-4. The aft seal segment 90 comprises ceramic matrix composite materials and extends around the central axis 11. The seal segment carrier 92 comprises metallic materials and couples to the aft seal segment 90 to receive loads applied to the aft seal segment 90 by gases passing through the turbine section 18. The threaded studs 93 extend through the seal segment carrier 92 and engages a portion of the seal segment 90 to couples the seal segment carrier 92 and the seal segment 90 together.

In the illustrative embodiments, the forward seal segment carrier 50 and the aft seal segment carrier 92 extend only partway around the central axis 11. As such, the turbine shroud rings 22, 24 are each made up of a number of seal segment carriers 50, 92 and cooperate to surround the turbine wheels 15, 17. In other embodiments, the forward and aft seal segment carriers 50, 92 are annular and non-segmented to extend fully around the axis 11 and surround the turbine wheels 15, 17. In yet other embodiments, certain components of the turbine shroud rings 22, 24 are segmented while other components are annular and non-segmented.

In the illustrative embodiment, the aft seal segment carrier 92 is integral with the vane mount ring 28 to form a one-piece component so that loads applied to both the aft seal segment 90 and the turbine vane 74 of the turbine vane assembly 26 are carried to the turbine case 20 via the aft bracket 41 of the turbine case 20. In other embodiments, the aft seal segment carrier 92 may be separately formed such that the aft seal segment carrier 92 and the vane mount ring 28 engage the turbine case 20 at separate interfaces.

In some embodiments, the vane mount ring 28 interfaces with the aft seal segment carrier 92 at the bird mouth connection 31 similar, if not the same, as the bird mouth connection 31 that couples the vane mount ring 28 with the forward seal segment carrier 54. In other embodiments, the forward seal segment carrier 54 may be integral with the vane mount ring 28 to form the one-piece component, while the bird mouth connection 31 is between the aft seal segment carrier 92 and the vane mount ring 28. In other embodiments, the carriers 54, 92 are separate components and the vane mount ring 28 may transfer loads from the turbine vane assembly 26 and the forward turbine shroud ring 22 to the turbine case 20.

Figure 5:
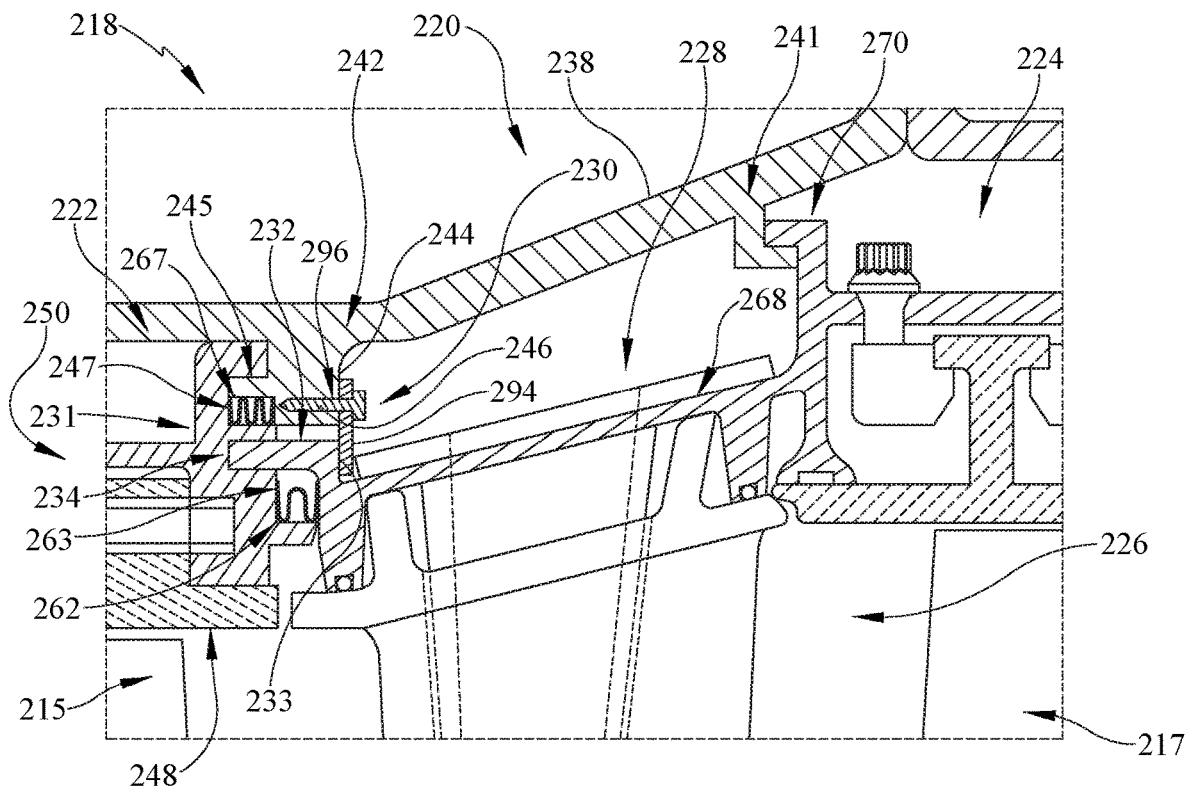
FIG. 5 is a cross-sectional view of another embodiment of a turbine section adapted for inclusion in the gas turbine engine of FIG. 1 showing that the turbine section includes a turbine case, forward and aft turbine shroud rings, a turbine vane assembly, a vane mount ring that couples the turbine vane assembly to the turbine case and interfaces with the forward turbine shroud ring to transfer loads from the turbine vane assembly and the forward turbine shroud ring to the turbine case, and an axial-retention feature that is configured to block axial movement at the interface between the vane mount ring and the forward turbine shroud ring.
Figure 6:
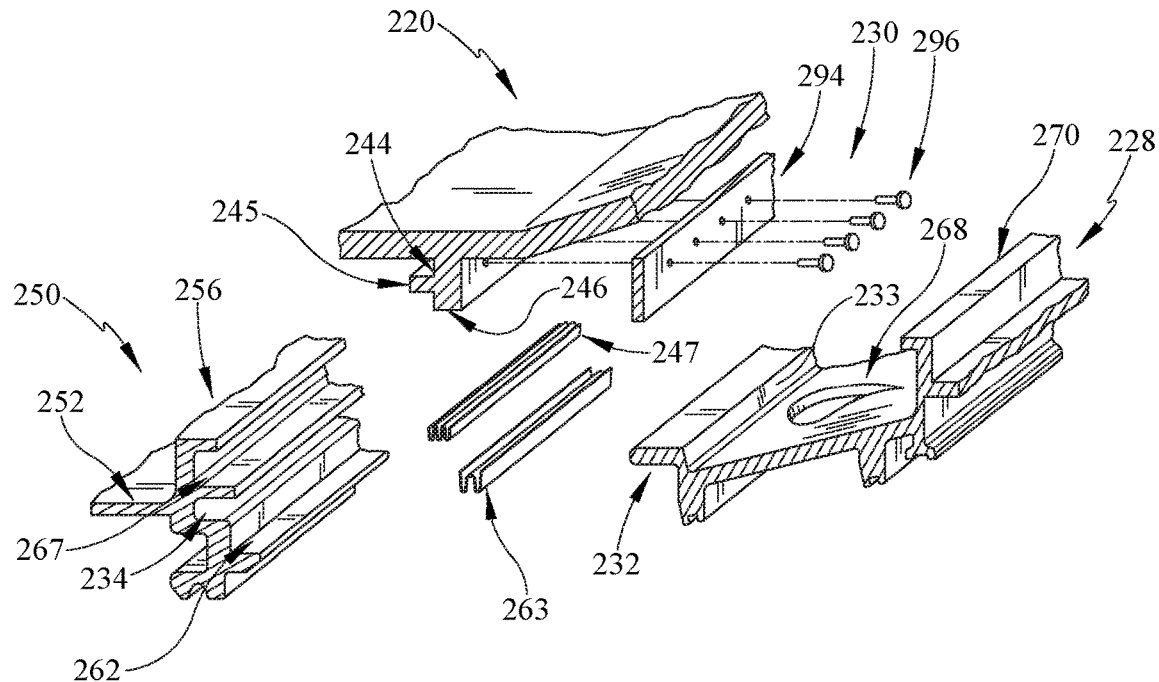
FIG. 6 is an exploded view of the turbine section of FIG. 5 showing that axial-retention feature includes a cover ring that extends at least partway about the central axis and a plurality of fastening pins that couple the cover ring to a portion of the turbine case, and further showing the cover ring engages the vane mount ring to block relative axial movement while also transferring circumferential loading of the turbine vane assembly.

Another embodiment of a turbine section 218 adapted for use in the gas turbine engine 10 is shown in FIGS. 5 and 6. The turbine section 218 is substantially similar to the turbine section 18 shown in FIGS. 1-4 and described herein. Accordingly, similar reference numbers in the 200 series indicate features that are common between the turbine section 18 and the turbine section 218. The description of the turbine section 18 is incorporated by reference to apply to the turbine section 218, except in instances when it conflicts with the specific description and the drawings of the turbine section 218.

The turbine section 18 includes a turbine case 220, a plurality of turbine shroud rings 222, 224, a turbine vane assembly 226, a vane mount ring 228, and an axial-retention feature 230 as shown in FIGS. 5 and 6. The turbine case 220 comprises metallic materials and extends around the central reference axis 11 of the gas turbine engine 10. The forward and aft turbine shroud rings 222, 224 are adapted to extend around forward and aft turbine wheels 215, 217 to block gases from passing over turbine blades during use of the turbine section 218 in the gas turbine engine 10. The forward turbine shroud ring 222 is arranged on a forward side of the turbine case 220 axially forward of the turbine vane assembly 226, while the aft turbine shroud ring 224 is arranged on an aft side of the turbine case 220 axially aft of the turbine vane assembly 226. The turbine vane assembly 226 is shaped to redirect hot gasses flowing through the turbine section 218.

The vane mount ring 228 couples the turbine vane assembly 228 to the turbine case 220 and interfaces with the forward turbine shroud ring 222 as shown in FIGS. 5 and 6. This interface carries loads applied by gases passing through the turbine section 218 to the forward turbine shroud ring 222 and the turbine vane assembly 228 to the turbine case 220 at a bracket 242 of the turbine case 20. The loads are carried to the turbine case 220 at the bracket 242 of the turbine case 220 so as to avoid the need for independent case interfaces, or brackets, for both the forward turbine shroud ring 222 and the turbine vane assembly 226.

In the illustrative embodiment, the vane mount ring 228 interfaces with the turbine shroud ring 222 at a bird mouth connection 231. The bird mount connection is a coupling in which an axially-extending flange 232 of the vane mount ring 228 is received in a corresponding axially-extending slot 234 of the turbine shroud ring 222 to engage the vane mount ring 228 with the turbine shroud ring 222. The axial-retention feature 230 couples to the turbine case 220 and is configured to block axial movement of the vane mount ring 228 away from the turbine shroud ring 222 maintaining the bird mouth connection 231 between the two components and minimizing the axial load transferred at the aft bracket 241 of the turbine case 220.

The axial-retention feature 230 is also configured to transfer circumferential loads from the turbine vane assembly 226 minimizing twisting of the turbine vane assembly 226 relative to the turbine case 220. The axial-retention feature 230 also acts as an anti-rotation feature to block circumferential rotation of the components relative to the turbine case 220.

The turbine case 220 includes an annular shell 238, an aft bracket 241, and the middle bracket 242 as shown in FIGS. 5 and 6. The annular shell 238 extends around the central reference axis 11. The aft bracket 241 extends radially inward from the annular shell 238. The middle bracket 242 extends radially inward from the annular shell 238 and is located axially forward of the aft hanger 241.

The middle bracket 242 includes a radially-extending portion 244, an axially-extending portion 245, and a stop tab 246 as shown in FIGS. 5 and 6. The radially-extending portion 244 extends radially inward from the annular shell 238. The axially-extending portion 245 extends axially forward from the radially-extending portion 244. The stop tab 246 extends radially inward from the radially-extending portion 244 to block removal of a seal 247 located between the middle bracket 242 and the turbine shroud ring 222.

The axial-retention feature 230 includes a cover ring 294 and a plurality of fastening pins 296 as shown in FIGS. 5 and 6. The cover ring 194 extends at least partway about the central axis and interfaces the middle bracket 242 and the axially-extending flange 232 of the vane mount ring 228. Each of the fastening pins 296 extends axially through the cover ring 294 into the middle bracket 242 to couple the cover ring 294 to the turbine case 220 and block axial movement of the axially-extending flange 232 out of the axially-extending slot 234. In the other embodiments, the fastening pins 296 may be bolts or another suitable fastener.

In the illustrative embodiment, the fastening pins 296 extend into the stop tab 246 of the middle bracket 242. In other embodiments, the fastening pins 296 may extend into another portion of the case 220 to couple the cover ring 294 in place. The fastening pins 296 may be press fit, brazed, glued, tacked, welded, etc. so as to retain the fastening pins 296 in place.

In the illustrative embodiment, the cover ring 294 is made up of several cover ring segments 294. Each of the segments 294 are coupled to the middle bracket 242 of the turbine case 220 by at least one fastening pin 296.

The circumferential loads are transferred from the turbine vane assembly 226 to the vane mount ring 228 are carried to the turbine case 220 by the axial-retention feature 230. The axial-retention feature 230 also reduces the axial loads transmitted at the axial bracket 241 of the turbine case 220 by blocking axial movement of the vane mount ring 228 relative to the turbine case 220.

The forward turbine shroud ring 222 includes a forward seal segment 248 and a forward seal segment carrier 250 as shown in FIGS. 5 and 6. The forward seal segment 248 comprises ceramic matrix composite materials and extends at least partway around the central axis 11. The forward seal segment carrier 250 comprises metallic materials and is coupled to the forward seal segment 248 to receive loads applied to the seal segment 248 by gases passing through the turbine section 218.

The forward seal segment carrier 250 includes a carrier panel 252 and an aft carrier hanger 256 as shown in FIGS. 5 and 6. The carrier panel 252 extends as least partway around the central axis 11. The aft carrier hanger 256 directly engages the middle bracket 242 of the turbine case 220. The aft carrier hanger 256 is also shaped to support installation of the forward turbine shroud ring 222 from the forward side of the turbine case 220 and installation of the turbine vane assembly 226 from the aft side of the turbine case 220.

In the illustrative embodiment, the aft carrier hanger 256 is shaped to include the axially-extending slot 234 as shown in FIGS. 5 and 6. The axially-extending slot extends axially into the aft carrier hanger 56.

In the illustrative embodiment, the aft carrier hanger 256 is also configured to support a seal 263 in a first circumferentially-extending seal passageway 262 and the seal 247 in a second circumferentially-extending seal passageway 267 as shown in FIGS. 5 and 6. The first circumferentially-extending seal passageway 262 is defined between the vane mount ring 28 and the seal segment carrier 50. The second circumferentially-extending seal passageway 267 is defined in the aft carrier hanger 256.

The vane mount ring 228 includes a mount body panel 268, a forward mount hanger 232, and an aft mount hanger 270 as shown in FIGS. 5 and 6. The mount body panel 268 extends at least partway around the central axis 11. The forward mount hanger 232 extends axially forward from the mount body panel 268 and directly engages the aft carrier hanger 256. The aft mount hanger 270 extends radially outward from the mount body panel at a location axially-aft of the forward mount hanger 232 and directly engages the aft bracket 241 of the turbine case 220.

In the illustrative embodiment, the forward mount hanger 232 is shaped to include the axially-extending flange 232 and a radially-extending portion 233 as shown in FIGS. 5 and 6. The radial portion 233 extends radially outwards from the mount body panel 268. The axially-extending flange 232 extends axially aft from the radial portion 233 into the corresponding axially-extending slot 234 formed in the aft carrier hanger 256 of the forward seal segment carrier 250. In the illustrative embodiment, the cover ring 294 engages the radial portion 233 of the hanger 232.

In some embodiments, the bird mouth connection 231 may be reversed such that the axially-extending slot 234 is formed in the vane mount ring 228 and the axially-extending flange 232 is formed in the aft carrier hanger 256 of the turbine shroud ring 222.

The present disclosure relates to load transferring and sealing of a turbine section 18, 218 within a gas turbine engine 10. Specifically, the present disclosure teaches transferring loads and sealing of turbine sections 18, 218 comprising ceramic matrix composite materials.

In some metallic seal segments and turbine vane assemblies, each component may be hung off a set of hooks attached to the turbine case 20, 220. However, embodiments with ceramic matrix composite components 84, 284, metallic spars/carriers 28, 76, 228, and associated sealing systems 47, 63, 247, 263 may benefit from more design space outboard of the turbine vane assembly 26, 226 than typical metallic vane designs in order to support the ceramic matrix composite components. Likewise, this arrangement may be modified to open design space radially above the ceramic matrix composite segments 48, 90 of the shroud rings 22, 24 if desirable.

In the illustrative embodiments, the first (or forward) ceramic matrix composite seal segment 22, 222 and the turbine vane assembly 26, 226 share a case hook, or bracket 42, 242. The single case interface 42, 242 opens up design space as needed above the turbine vane assembly 26, 226 to enable a ceramic matrix composite vane 84.

The typical mounting arrangement of metallic vanes may also result in substantial relative movement at the sealing interface between a ceramic matrix composite seal segment 22, 222 and a ceramic vane assembly 26, 226. The relative movement may be in both the radial and axial directions.

In some embodiments, this large relative movement may lead to a high leakage sealing system in order to combat the relative movement. A flapper seal may be used to seal this interface as flapper seals may withstand large relative movements at the interface. However, flapper seals may inherently leak substantially more than other seal types, such as "W" or omega seals, resulting in a decrease in fuel economy or performance of the engine 10.

The combination of a high leakage flow along with a traditional interface at the flow path between the back face of the turbine shroud ring 22 and overlap of the platform 86 of the turbine vane assembly 26 may be problematic for ceramic matrix composite seal segments 48. The interface can include an axial overlap, with a flow discourager cavity along the axial length to discourage local hot gas ingress. This arrangement along with high leakage flow rates may tend to chill the trailing edge of the ceramic matrix composite turbine vane 74.

Due to low thermal conductivity and low stress allowables of the ceramic matrix composite materials, the chilling of the trailing edge may result in developing thermal stresses along the trailing edge that which are higher than a ceramic component can experience and still provide full life for the ceramic component. The present disclosure teaches a turbine section 18, 218 arrangement that enables both, the lowering of the interface seal leakage and the rerouting of that leakage flow such that it does not scrub the back face of the ceramic matrix composite seal segment 48.

Steps in the flow path surface along the primary gas path 23 may affect aero performance of the gas turbine engine 10. Inherently, there may be some amount of step in the flow path surface as the flow passes axially from the trailing edge of the seal segment 48 to the leading edge of the downstream turbine vane 74. Although the engine is typically designed nominally to have no step at the critical conditions, engine to engine (or from start of engine life to the end) may also result in a step at this interface. The same variations associated with metallic arrangements that results in large relative movement at the seal interface may also result in large radial movement at the flow path. The large relative movement may reduce the aero performance within the gas turbine engine 10 and as a result, reducing the performance or fuel economy.

The present disclosure teaches how the radial loading of the turbine vane assembly 26, 226 and associated support 76 is transmitted to the turbine case 20, 220 to allow for additional space above the turbine vane assembly 26, 226. In a typical turbine section, the arrangement of components may need careful consideration of the radial extents of parts, to allow the parts to be inserted as a pre-assembly ring, rather than individual components into the turbine casing 20, 220. The assembly may be completed while also lowering the rotating components, i.e. the turbine wheels 15, 17, into the turbine case 20, 220.

In the illustrative embodiments, the radial height of the vane-support spar 76 of the turbine vane assembly 26 is reduced by interfacing the seal segment carrier 50 of the forward turbine shroud ring 22, rather than directly to the turbine case 20. In the illustrative embodiment, the bird mouth connection between the vane mount ring 28 and the forward seal segment carrier 50 provides the interface while avoiding the needed for independent case interfaces as shown in FIGS. 2-4.

An element of circumferential loading may be transmitted at this interface to minimize twisting of the turbine vane assembly 226. This is an important performance metric as the twisting may affect the turbine capacity by changing the throat area between adjacent airfoils 84.

In some embodiments, the anti-rotation function may be a lug in a slot. In other embodiments, the anti-rotation feature may be axial pin in a slot. In other embodiments, the anti-rotation feature may be a radial pin in a slot/hole. The seal segments 222 may be anti-rotated to the turbine case 220 with a pin, such that circumferential loading from the turbine vane assembly 226 passes through the carrier to the pin, to the turbine case 220.

In other embodiments, an optional axial load transfer feature 230 may be employed as means of reducing axial loads transmitted at the aft end of the turbine vane assembly 226. In the illustrative embodiment, a cover ring 294 blocks axial movement of the vane mount ring 228. The axial retention reduces the deflection and/or stresses in the metallic support structure 228 as shown in FIGS. 5 and 6.

The turbine section 18, 218 may simplify the casing manufacturing sequence by having a shared attachment feature machined, rather than one per component. In addition, the simplified turbine case 20, 220 may minimize the relative movements between the carriers, easing the design of the sealing and enabling the packaging of a w-seal or suitable metal-metal seal.

With some mounting arrangements, the axial movement throughout the operating envelope between the turbine shroud ring 22 and the turbine vane assembly 26 was substantial. Relatively large axial movement at the high operating temperatures experienced may make it difficult to use a very efficient seal such as a "W" seal. Wear, stress relaxation, or excessive loads may become an issue with the large axial movement.

In some embodiments, flapper/feather seals may be used at the interface. The flapper/feather seal may be able to handle large relative movement and high temperatures, but the seal is not very efficient.

In the illustrative embodiments, the sealing between the turbine shroud ring 22 and the turbine vane assembly 26 includes a "W" seal as shown in FIGS. 2-4. The "W" seal may be used due to the arrangement of the interface between the components, which reduces the relative axial movement and very little if any radial movement. Therefore, the arrangement of the turbine section 18 enables better seals to be utilized, reducing leakage and improving engine efficiency.

Due to the traditional leakage cooling flows at the carrier interface 31, 231, significant thermal gradients may be induced in the ceramic matrix composite components. However, greater flexibility is permitted through the arrangement. The axial location of the trailing edge of the ceramic matrix composite seal segment 48 to the leading edge of the end wall 86 of the turbine vane 74 may be tailored to minimize the impingement coolant and the scrubbing coolant on the ceramic features.

The turbine section 18 of the present disclosure also enables packaging appropriate sealing features in both ceramic components and optimization of any damping cavity that may be needed. One potential advantage of the embodiment of FIGS. 2-4 may be that the radial loads of the turbine vane assembly 26 is transferred to the seal segment carrier 50 directly below the connection point 42 with the outer case 20. The connection may lead to efficient transfer of the radial load through the carrier structure 50, minimizing stress and weight.

In other embodiments, the attachment features may be reversed, i.e. the rail feature, or the axially-extending flange 32 is machined into the seal segment carrier 50. The bird mouth connection 31 may be featured between the axially-extending slot 34 formed in the vane mount ring 28 and the axially-extending flange 32 formed in the carrier 50.

The reduced radial space claim above the turbine vane assembly 26, 226 enables the outer case 20, 220 to have a lower diameter, lowering the cost and weight of the engine 10. The reduced radial space above the turbine vane assembly 26, 226 may enable a thinner wall since wall thickness is typically sized at maximum thickness as determined by the internal pressure and containment.

Improved performance and fuel economy can enable lower leakage seals. The arrangement may reduce the relative movement at the interface 31, 231, which should thereby enable sealing arrangements with lower leakage.

Improved life of the ceramic seal segment 48 may result from reducing the flow through the interface seal and rerouting of the flow such that it does not scrub the backside of the ceramic seal segment 48 along the trailing edge. This arrangement may reduce the thermal gradients in the part, thereby reducing the thermal stresses along the trailing edge.

Simplified casing manufacturing, i.e. the removal of features, may lower the cost of materials and/or repair. The inherent step in the flow path between the trailing edge of the seal segment 48 and the leading edge of the turbine vane 74 due to manufacturing and operation variation is significantly reduced. The radial location is instead tied to the radial location of the seal segment assembly 22.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section of a gas turbine engine comprising
a turbine case comprising metallic materials, the turbine case including an annular shell that extends around a central reference axis and a first bracket that extends radially inward from the annular shell,
a turbine shroud ring adapted to extend around a turbine wheel to block gases from passing over turbine blades during use of the turbine section in the gas turbine engine, the turbine shroud ring including a seal segment comprising ceramic matrix composite materials that extends at least partway around the central reference axis and a seal segment carrier comprising metallic materials that is coupled to the seal segment to receive loads applied to the seal segment by gases passing through the turbine section,
a turbine vane assembly including a turbine vane comprising ceramic matrix composite materials shaped to redirect hot gases flowing through the turbine section and a vane-support spar comprising metallic materials that extends radially through the turbine vane to receive loads applied to the turbine vane by gases passing through the turbine section, and
a vane mount ring that couples the vane-support spar and the turbine vane of the turbine vane assembly to the first bracket of the turbine case, wherein the vane mount ring interfaces with the seal segment carrier so that loads applied to both the seal segment and the turbine vane by gases passing through the turbine section are carried to the turbine case at the first bracket avoiding the need for independent case interfaces for the seal segment and the turbine vane,
wherein the vane mount ring is shaped to include a mount body panel that extends at least partway around the central reference axis, a forward support that extends radially inward from the mount body panel and engages the turbine vane assembly, and an aft support spaced apart axially from the forward support arm that extends radially inward form the mount body panel and engages the turbine vane assembly,
wherein the vane-support spar includes an outer mount panel arranged radially outward of the mount body panel of the vane mount ring so as to couple the vane-support spar to the vane mount ring and a rod that extends radially inward from the outer mount panel through the mount body panel and the turbine vane, and
wherein the turbine vane includes an outer end wall, an inner end wall spaced radially inward of the outer end wall, an airfoil that extends between and interconnects the outer and inner end walls, and outer load transfer features that extend radially outward from the outer end wall and engage the forward and aft supports of the vane mount ring.

2. The turbine section of claim 1, wherein the vane mount ring interfaces with the seal segment carrier at a bird mouth connection in which an axially-extending flange is received in a corresponding axially-extending slot to couple the vane mount ring to the seal segment carrier.

3. The turbine section of claim 2, wherein the seal segment carrier is shaped to include a hanger that directly engages the first bracket of the turbine case.

4. The turbine section of claim 3, wherein the turbine shroud ring is arranged axially forward of the turbine vane and the hanger of the seal segment carrier is shaped to support installation of the turbine shroud ring into the turbine case from a forward side of the turbine case while the bird mouth connection is shaped to support installation of the turbine vane assembly from an aft side of the turbine case.

5. The turbine section of claim 2, wherein a seal is located radially inward of the bird mouth connection between the vane mount ring and the seal segment carrier.

6. The turbine section of claim 5, wherein the seal is located within a circumferentially-extending seal passageway defined by the vane mount ring and the seal segment carrier.

7. The turbine section of claim 2, further comprising a second turbine shroud ring adapted to extend around a second turbine wheel, the second turbine shroud ring including a second seal segment comprising ceramic matrix composite materials that extends around the central axis and a second seal segment carrier comprising metallic materials coupled to the second seal segment to receive loads applied to the second seal segment by gases passing through the turbine section,
wherein the turbine case includes a second bracket that extends radially inward from the annular shell, and
wherein the vane mount ring is integral with the second seal segment carrier to form a one-piece component so that loads applied to both the second seal segment and the turbine vane by gases passing through the turbine section are carried to the turbine case via the second bracket.

8. The turbine section of claim 2, further comprising an axial-retention feature coupled to the turbine case and configured to block axial movement of the vane mount ring away from the turbine shroud ring maintaining the bird mouth connection between the vane mount ring and the seal segment carrier.

9. The turbine section of claim 1, wherein the vane mount ring is integral with the seal segment carrier to form a one-piece component.

10. A turbine section of a gas turbine engine comprising
a turbine case including an annular shell that extends around a central reference axis and a first bracket that extends radially inward from the annular shell,
a turbine shroud ring adapted to extend around a turbine wheel,
a turbine vane assembly including a turbine vane comprising ceramic matrix composite materials shaped to redirect hot gases flowing through the turbine section and a vane-support spar comprising metallic materials that extends radially through the turbine vane, and
a vane mount ring that interfaces with the turbine shroud ring so that loads applied to both the turbine shroud ring and the turbine vane by gases passing through the turbine section are carried to the turbine case at the first bracket,
wherein the vane mount ring interfaces with the turbine shroud ring at a bird mouth connection in which an axially-extending flange is received in a corresponding axially-extending slot to couple the vane mount ring to the turbine shroud ring, and
wherein the turbine case further comprises an axial-retention feature coupled to the turbine case and configured to (i) block axial movement of the vane mount ring away from the turbine shroud ring so as to maintain the bird mouth connection between the vane mount ring and the turbine shroud ring and minimize the axial load transferred to a second bracket included in the turbine case located axially aft of the first bracket and (ii) transfer circumferential loads from the turbine vane assembly so as to minimize twisting of the turbine vane assembly relative to the turbine case.

11. The turbine section of claim 10, wherein one of the turbine shroud ring and the vane mount ring is shaped to include a hanger that directly engages the first bracket of the turbine case.

12. The turbine section of claim 10, wherein a seal is located radially inward of the bird mouth connection between the vane mount ring and the turbine shroud ring.

13. The turbine section of claim 12, wherein the seal is located within a circumferentially-extending seal passageway defined by the vane mount ring and the turbine shroud ring.

14. The turbine section of claim 10, further comprising a second turbine shroud ring adapted to extend around a second turbine wheel, the second turbine shroud ring including a plurality of seal segments arranged around the central reference axis,
wherein the turbine case includes a second bracket that extends radially inward from the annular shell, and
wherein the vane mount ring is arranged radially outward of the plurality of seal segments included in the second turbine shroud ring and provides a carrier for supporting the plurality of seal segments.

15. The turbine section of claim 10, wherein the turbine shroud ring includes a plurality of seal segments arranged around the central reference axis, and wherein the vane mount ring is arranged radially outward of the plurality of seal segments included in the turbine shroud ring to provide a carrier for supporting the plurality of seal segments.

16. The turbine section of claim 10, wherein the axial retention feature includes a cover ring that extends circumferentially partway about the central reference axis and a fastener that extends axially into the cover ring and the turbine case to couple the cover ring to the turbine case and block axial movement of the axially-extending flange out of the axially-extending slot.

17. A turbine section of a gas turbine engine comprising
a turbine case comprising metallic materials, the turbine case including an annular shell that extends around a central reference axis and a first bracket that extends radially inward from the annular shell,
a turbine shroud ring adapted to extend around a turbine wheel, the turbine shroud ring including a seal segment extends at least partway around the central axis and a seal segment carrier that coupled to the seal segment,
a turbine vane assembly including a turbine vane comprising ceramic matrix composite materials shaped to redirect hot gases flowing through the turbine section and a vane-support spar comprising metallic materials that extends radially through the turbine vane to receive loads applied to the turbine vane by gases passing through the turbine section, and
a vane mount ring coupled to the turbine vane assembly, wherein the vane mount ring interfaces with the seal segment carrier and the seal segment carrier is coupled to the case at the first bracket so that loads applied to both the seal segment and the turbine vane by gases passing through the turbine section are carried to the turbine case at the first bracket,
wherein the seal segment carrier is shaped to include a carrier panel that extends at least partway about the central reference axis and a hanger extending from the carrier panel that directly engages the first bracket of the turbine case, the hanger shaped to include a hook that extends radially outward form the carrier panel and engages with the first bracket, a support flange that extends axially aft from the hook radially inward of the first bracket, a segment carrier portion that extends radially inward from the carrier panel, and a locating flange that extends axially aft from the segment carrier portion radially inward of the support flange,
wherein the vane mount ring is shaped to include a mount body panel that extends at least partway around the central reference axis, a forward support that extends radially inward from the mount body panel and engages the turbine vane assembly, and an axially-extending flange that extends axially forward from the mount body panel and directly engages the seal segment carrier, and
wherein the vane mount ring interfaces with the seal segment carrier at a bird mouth connection in which the axially-extending flange is received in a corresponding axially-extending slot formed between the support flange and the segment carrier portion to couple the vane mount ring to the seal segment carrier.

18. The turbine section of claim 17, wherein first a seal is located radially inward of the bird mouth connection between the vane mount ring and the seal segment carrier and the first seal is radially supported on the locating flange of the seal segment carrier.

19. The turbine section of claim 18, wherein the first seal is located within a first circumferentially-extending seal passageway defined by the axially-extending flange and the forward support of the vane mount ring and the segment carrier portion and the locating flange of the seal segment carrier.

20. The turbine section of claim 17, wherein the hook of the seal segment carrier includes a radial post that extends radially outward from the carrier panel and an attachment flange that extends axially aft from the radial post at an outer radial end of the radial, and wherein the a second seal is located within the second circumferentially-extending seal passageway defined by the radial post and the attachment flange of the hook and the support flange of the seal segment carrier.

* * * * *